United States Patent
Tomosada et al.

(10) Patent No.: US 6,555,591 B1
(45) Date of Patent: Apr. 29, 2003

(54) FOAM CROSS-LINKED WITH METAL SALT AND PROCESS FOR PRODUCTION

(75) Inventors: Tsuyoshi Tomosada, Kyoto (JP); Kimihiko Noda, Kyoto (JP); Satoshi Sasaki, Kyoto (JP); Hideo Nishiguchi, Kyoto (JP); Hideyuki Nishida, Kyoto (JP)

(73) Assignee: Sanyo Chemical Industries, Ltd., Kyoto (JP)

(*) Notice: Subject to any disclaimer, the term of this patent is extended or adjusted under 35 U.S.C. 154(b) by 0 days.

(21) Appl. No.: 09/367,500

(22) PCT Filed: Feb. 19, 1998

(86) PCT No.: PCT/JP98/00680

§ 371 (c)(1),
(2), (4) Date: Oct. 15, 1999

(87) PCT Pub. No.: WO98/37132

PCT Pub. Date: Aug. 27, 1998

(30) Foreign Application Priority Data

Feb. 19, 1997 (JP) .................................... 9-052447

(51) Int. Cl.⁷ .................................................. C08J 9/00
(52) U.S. Cl. ........................ 521/124; 521/92; 521/93; 521/125; 521/906; 521/907
(58) Field of Search ................... 521/123, 124, 521/125, 906, 907, 92, 93

(56) References Cited

U.S. PATENT DOCUMENTS

| 3,983,081 A | * | 9/1976 | Dieterich et al. | ....... 260/2.5 AJ |
|---|---|---|---|---|
| T952,009 I4 | | 11/1976 | Lawson et al. | ......... 260/2.5 L |
| 4,119,583 A | | 10/1978 | Filip et al. | .................. 521/103 |
| 4,215,202 A | | 7/1980 | Park | .............................. 521/81 |
| 4,596,832 A | | 6/1986 | Ariga et al. | ................... 521/58 |
| 4,769,179 A | | 9/1988 | Kato et al. | .................... 252/609 |
| 4,808,637 A | | 2/1989 | Boardman et al. | ......... 521/50.5 |
| 5,154,713 A | | 10/1992 | Lind | .......................... 604/358 |
| 5,264,495 A | | 11/1993 | Irie et al. | .................... 125/301 |
| 5,340,840 A | | 8/1994 | Park et al. | ..................... 521/60 |
| 5,356,941 A | * | 10/1994 | Sullivan et al. | ............... 521/96 |
| 5,451,613 A | | 9/1995 | Smith et al. | ................... 521/53 |
| 5,459,172 A | | 10/1995 | Kaku et al. | ................. 521/174 |
| 5,945,461 A | | 8/1999 | Gosiewski et al. | ......... 521/123 |
| 6,066,682 A | * | 5/2000 | Noda et al. | |

FOREIGN PATENT DOCUMENTS

| DE | 196 54 158 A1 | 6/1997 |
|---|---|---|
| JP | 57144731 A | 9/1982 |
| JP | 3-269028 | 11/1991 |

OTHER PUBLICATIONS

Benning, Plastic Foams: the physics and chemistry of product performance and process technology, vol. 2, pp. 320–325.

\* cited by examiner

Primary Examiner—James J. Seidleck
Assistant Examiner—Melanie D. Bagwell
(74) Attorney, Agent, or Firm—Connolly Bove Lodge & Hutz LLP

(57) ABSTRACT

The present invention has its object to provide a foam outstanding in electrification and heat insulating and sound insulating properties and has high compressive strength even when it has low density. The present invention relates to a foam comprising an organic polymer expanded matrix (I) and at least one kind of inorganic substance (II) selected from the group consisting of metals, metal compounds and non-metal inorganic fillers, wherein said expanded matrix (I) contains metal salt-crosslinks and the relation between the weight percentage (M) of the metal forming said metal salt-crosslinks in the expanded matrix (I) based on the total weight of the expanded matrix (I) and the inorganic substance (II) and the weight percentage (S) of the inorganic substance (II) based on the total weight of the expanded matrix (I) and the inorganic substance (II) satisfies the following expression.

$$M \geq 10 - S/4 \qquad (1)$$

wherein $M \leq 50$ and $S \geq 5$.

16 Claims, No Drawings

FOAM CROSS-LINKED WITH METAL SALT AND PROCESS FOR PRODUCTION

TECHNICAL FIELD

The present invention relates to a novel foam which is useful for such applications as a heat insulating material, a structural material, a protective material and a sound insulating material.

BACKGROUND ART

Generally, as a foam, polyurethane foam, polyurea foam, polystyrene foam, polyolefin foam and polycyclopentadiene foam, among others are known. Moreover, as a kind of polyolefin foam providing for improved productivity, an ion-crosslinked polyethylene foam which can be produced by reacting an ethylene-carboxylic acid copolymer with a metal carbonate (Japanese Kokoku Publication Hei-2-11621) has been proposed.

However, the conventional foams not only involves the use of starting materials with high ecological loads but cannot avoid generation of noxious gases and soot owing to incomplete combustion in incineration, destruction of the incinerator through generation of the excess heat of combustion, and generation of static electricity, all of which cause a problem that a burden on the environment is high.

The ion-crosslinked polyethylene foam disclosed in Japanese Kokoku Publication Hei-2-11621 has an expansion ratio of as much as about 2 to 5 and, therefore, the low-density series cannot be provided. Moreover, if an attempt is made to increase the expansion ratio of the carboxylic acid-containing copolymer by combining other blowing agent, the foam strength is so short that cells are destroyed and low-density foams cannot be provided. In addition, because the foam density cannot be lowered, the temperature-time area and the emitting smoke factor are remarkably high so that criteria of the flame retardance test (JIS A-1321) for Grade 1 to Grade 3 cannot be satisfied.

SUMMARY OF THE INVENTION

The inventors of the present invention intensively examined a foam of reduced ecological burden and of low density and found that a metal bound to an organic polymer contributes a great deal to flame retardance and have developed the present invention.

The present invention relates to a foam comprising an organic polymer expanded matrix (I) and at least one kind of inorganic substance (II) selected from the group consisting of metals, metal compounds and non-metal inorganic fillers, wherein said expanded matrix (I) contains metal salt-crosslinks and the relation between the weight percentage (M) of the metal forming said metal salt-crosslinks in the expanded matrix (I) based on the total weight of the expanded matrix (I) and the inorganic substance (II) and the weight percentage (S) of the inorganic substance (II) based on the total weight of the expanded matrix (I) and the inorganic substance (II) satisfies the following expression.

$$M \geq 10 - S/4 \quad (1)$$

wherein $M \leq 50$ and $S \geq 5$.

The present invention further relates to a process for producing a metal salt-crosslinked foam which comprises subjecting an organic polymer containing a metal salt-crosslinkable functional group to crosslinking with a metal or a metal compound and expansion in the presence of an inorganic substance (II) optionally together with a blowing agent.

The present invention relates, in a further aspect, to a process for producing a metal salt-crosslinked foam which comprises subjecting a metal salt-crosslinkable functional group-containing monomer to concurrent polymerization, crosslinking with a metal or a metal compound and expansion in the presence of an inorganic substance (II) optionally together with a blowing agent.

The present invention further relates to a process for producing a metal salt-crosslinked foam which comprises subjecting a metal salt-crosslinked monomer to concurrent polymerization and expansion in the presence of an inorganic substance (II) and a blowing agent.

DETAILED DESCRIPTION OF THE INVENTION

The foam of the present invention comprises an organic polymer expanded matrix (I) and an inorganic substance (II). The expanded matrix (I) mentioned above contains metal salt-crosslinks. The term "metal salt-crosslinks" as used in this specification means chemical bonds formed between functional groups of an organic polymer through the intermediary of a metal. The mode of chemical bond involved may for example be ionic bond or coordination bond.

In the foam of the present invention, the relation between the weight percentage (M) of the metal forming said metal salt-crosslinks in the expanded matrix (I) and the weight percentage (S) of the inorganic substance (II) which are based on the total weight of the expanded matrix (I) and the inorganic substance (II) should satisfy the following expression (1), $$M \geq 10 - S/4 \quad (1)$$

wherein $M \leq 50$, $S \geq 5$.

Unless the above expression (1) is satisfied, the flame retardance of the foam is insufficient. Therefore, the above relation should be complied with.

More preferably, the following expression (2) should be satisfied.

$$M \geq 12 - S/4 \quad (2)$$

Referring to the above expressions (1) and (2), if M is greater than 50, the quantity of the metal forming said metal salt-crosslinks in the expanded matrix (I) will be so large that the foam will become brittle. If S is less than 5, the inorganic substance (II) will be so little that the flame retardance will be short.

The weight percentage (M) of the metal forming said metal salt-crosslinks and the weight percentage (S) of the inorganic substance (II) in the foam of the present invention can be determined by the X-ray diffraction analysis described hereinafter.

The above expanded matrix (I) and inorganic substance (II) are now explained in that order.

Expanded Matrix (I)

In the present invention, the expanded matrix (I) has metal-salt crosslinks. The metal in the metal-salt crosslinks may be one derived from any of various metals and metal compounds.

The metal or metal compound mentioned above is not particularly restricted but includes polyvalent metals, for example alkaline earth metals such as magnesium, calcium, barium, etc.; Group IIIa and Group IVa metals such as aluminum, germanium, tin, etc.; transition metals such as iron, cobalt, nickel, copper, zinc, etc.; and various salts, oxides and hydroxides of those metals.

The metal salt mentioned above is not particularly restricted but includes the carbonates, sulfates, acetates, borates, phosphates, nitrates and other salts of metals.

Preferred, among them, is the salt, oxide or hydroxide of at least one polyvalent metal selected from the group consisting of calcium, magnesium, zinc, barium, aluminum and iron.

The expanded matrix (I) mentioned above is obtained by an expansion using a substance having a blowing action. The substance having a blowing action may be the metal compound used for the formation of said metal salt-crosslinks provided that it has a blowing action. It is also possible to use a blowing agent.

As the blowing agent, there can be used, for example, at least one member selected from the group consisting of metal carbonates and metal hydrogencarbonates. The metals of said metal carbonates or metal hydrogencarbonates may be monovalent metals such as alkali metals (e.g. sodium, potassium, rubidium) and polyvalent metals such as the above-mentioned alkaline earth metals, Group IIIa and Group IVa metals, and transition metals. Among them, polyvalent metals are preferred. In this case, the metal salt not only acts as a blowing agent but forms metal salt-crosslinks with metal salt-crosslinkable functional groups, for example, carboxyl groups. More preferably, the polyvalent metal is at least one member selected from the group consisting of calcium, magnesium, barium, zinc, aluminum and iron.

As the blowing agent mentioned above, not only metal carbonates and metal hydrogencarbonates but also the known blowing agents can be employed. For example, azide compounds such as sodium azide; azo compounds such as AIBN, azobiscyanovaleric acid, azodicarbonamide, azobisamidinopropane salt, etc.; carbonates or hydrogencarbonates of monovalent bases, such as ammonium carbonate; gases such as chlorofluorocarbon gases, butane gas, etc.; low-boiling solvents; and water can be mentioned.

The above-mentioned expanded matrix (I) comprises an organic polymer. The organic polymer mentioned just above can be at least one polymer selected from the group consisting of ① radical-polymerization polymers containing metal salt-crosslinkable functional groups (PA), ② polyaddition polymers containing metal salt-crosslinkable functional groups (PB) and ③ addition-condensation polymers containing metal salt-crosslinkable functional groups (PC).

As the metal salt-crosslinkable functional group mentioned above, carboxyl group, sulfonic acid group and phosphate group can be mentioned.

The metal salt-crosslinkable functional group content of said organic polymer should generally be 30 to 625 milliequivalents/g, preferably 60 to 625 milliequivalents/g, in consideration of the flame retardant performance and physical properties of the foam.

The polymers ①, ② and ③ are now described in detail in the order mentioned.

① Radical-polymerization Polymer Containing a Metal Salt-crosslinkable Functional Group (PA)

The constituent monomer of the above radical-polymerization polymer containing a metal salt-crosslinkable functional group (PA) includes various unsaturated monomers containing a metal salt-crosslinkable functional group and, where necessary, other unsaturated monomers (a4).

The unsaturated monomers containing a metal salt-crosslinkable functional group mentioned above include a carboxyl group-containing unsaturated monomer (a1), a sulfonic acid group-containing unsaturated monomer (a2) and a phosphate group-containing unsaturated monomer (a3).

The carboxyl group-containing unsaturated monomer (a1) mentioned just above is not particularly restricted but includes acrylic acid, methacrylic acid, crotonic acid, itaconic acid, maleic acid (anhydride), fumaric acid, cinnamic acid, maleic acid monoalkyl esters, fumaric acid monoalkyl esters, and itaconic acid monoalkyl esters (said alkyl may contain 1 to 8 carbon atoms), among others. Preferred from cost consideration are acrylic acid and methacrylic acid.

The sulfonic acid group-containing unsaturated monomer (a2) mentioned above is not particularly restricted but includes vinylsulfonic acid, (meth)allylsulfonic acid, methyl vinylsulfonate, styrenesulfonic acid, α-methylstyrenesulfonic acid, sulfopropyl (meth)acrylate, 2-hydroxy-3-(meth)acryloxypropylsulfonic acid, 2-(meth) acryloylamino-2,2-dimethylethanesulfonic acid, 3-(meth) acryloyloxyethanesulfonic acid, 3-(meth)acryloyloxy-2-hydroxypropanesulfonic acid, 2-(meth)acrylamido-2-methylpropanesulfonic acid, 3-(meth)acrylamido-2-hydroxypropanesulfonic acid, alkyl (of 3 to 18 carbon atoms)allylsulfosuccinic acid, sulfate of poly(n=2 to 30)oxyalkylene (ethylene, propylene, butylene, etc.; each of which may be a homopolymer, a random polymer or a block polymer)mono(meth)acrylate [e.g. sulfate of poly(n=5 to 15)oxypropylene monomethacrylate], and polyoxyethylene polycyclic phenyl ether sulfate, etc.

The phosphate group-containing unsaturated monomer (a3) mentioned above is not particularly restricted but includes phosphate monoesters of hydroxyalkyl (meth) acrylate, for example, 2-hydroxyethyl (meth) acryloylphosphate, phenyl-2-acryloyloxyethyl phosphate, etc.

The preferred, among said carboxyl group-containing unsaturated monomer (a1), sulfonic acid group-containing unsaturated monomer (a2) and phosphate group-containing unsaturated monomer (a3), is the carboxyl group-containing unsaturated monomer (a1).

The other unsaturated monomer (a4) mentioned above is not particularly restricted but includes aliphatic vinyl-containing hydrocarbons such as ethylene, propylene, butene, isobutylene, pentene, heptene, diisobutylene, octene, dodecene, octadecene, butadiene, isoprene, etc.; alicyclic vinyl-containing hydrocarbons such as cyclohexene, (di) cyclopentadiene, pinene, limonene, indene, vinylcyclohexene, etc.; aromatic vinyl-containing hydrocarbons such as styrene, α-methylstyrene, vinyltoluene, 2,4-dimethylstyrene, ethylstyrene, isopropylstyrene, etc.; hydroxyl group-containing unsaturated monomers such as hydroxystyrene, N-methylol(meth)acrylamide, hydroxyethyl (meth)acrylate, hydroxypropyl (meth)acrylate, polyethylene glycol mono(meth)acrylate, (meth)allyl alcohol, crotyl alcohol, isocrotyl alcohol, etc.; nitrogen-containing unsaturated monomers such as dimethylaminoethyl (meth) acrylate, diethylaminoethyl (meth)acrylate, t-butylaminoethyl methacrylate, N-aminoethyl (meth) acrylamide, (meth)allylamine, morpholinoethyl (meth) acrylate, 4-vinylpyridine, 2-vinylpyridine, crotylamine, N,N-dimethylaminostyrene, vinylimidazole, N-vinylpyrrole, (meth)acrylamide, N-methyl(meth) acrylamide, N-butylacrylamide, diacetoneacrylamide, N-methylol(meth)acrylamide, N,N'-methylene-bis(meth) acrylamide, cinnamamide, (meth)acrylonitrile, cyanostyrene, etc.; epoxy group-containing unsaturated monomers such as glycidyl (meth)acrylate, tetrahydrofurfuryl (meth)acrylate, p-vinylphenylphenyl oxide, etc.; halogen-containing unsaturated monomers such as vinyl chloride, vinyl bromide, vinylidene chloride, allyl chloride, dichlorostyrene, chloroprene, etc.; alkyl (meth)acrylates such as methyl (meth)acrylate, ethyl (meth)acrylate, propyl (meth)acrylate, butyl (meth)acrylate, 2-ethylhexyl (meth) acrylate, dodecyl (meth)acrylate, etc. (said alkyl contains 1 to 20 carbon atoms); polyalkylene glycol chain-containing unsaturated monomers such as polyethylene glycol(mol. wt. 300) mono(meth)acrylate, polypropylene glycol(mol. wt. 500) monoacrylate, methyl alcohol-ethylene oxide (10 mole) adduct (meth)acrylate, lauryl alcohol-ethylene oxide (30 mole) adduct acrylate, etc.; and vinyl esters such as vinyl formate, vinyl acetate, vinyl butyrate, vinyl propionate, vinyl butyrate and so forth.

The other unsaturated monomer (a4) may be partially replaced with a polyfunctional unsaturated monomer. The polyfunctional unsaturated monomer is not particularly restricted but includes divinylbenzene, (poly)ethylene glycol di(meth)acrylate, (poly)propylene glycol di(meth) acrylate, trimethylolpropane di- or tri(meth)acrylate, glycerin di- or tri(meth)acrylate, pentaerythritol di-, tri- or tetra (meth)acrylate, diallyl phthalate, and (poly)ethylene glycol diallyl ether, among others.

The metal salt-crosslinkable functional group-containing unsaturated monomer content of said radical-polymerization polymer containing ametal salt-crosslinkable functional group (PA) should be generally not less than 30 weight %, preferably not less than 50 weight %, from the standpoint of foam quality and cost.

When said other unsaturated monomer (a4) is used, its content should be generally not greater than 70 weight %, preferably not greater than 50 weight %, more preferably not greater than 40 weight %. When said polyfunctional unsaturated monomer is used as some other unsaturated monomer (a4) mentioned above, the monomer content should be preferably not greater than 80 weight % of (a4) in consideration of foam quality and cost.

The above radical-polymerization polymer containing a metal salt-crosslinkable functional group (PA), can be provided by the known polymerization technology.

As the polymerization initiator, there can be mentioned the known radical-polymerization initiators, for example oil-soluble radical-polymerization initiators such as azobisisobutyronitrile, benzoyl peroxide, etc. and water-soluble radical-polymerization initiators such as azobiscyanovaleric acid, azobisamidinopropane salt, ascorbic acid-hydrogen peroxide mixture (redox), potassium persulfate or sodium persulfate-sodium bisulfite mixture (redox), etc. The preferred is a water-soluble radical-polymerization initiator.

In this production process, the polymerization temperature is generally 0 to 120° C., preferably room temperature to 90° C.

From the standpoint of foam properties, the number average molecular weight of said radical-polymerization polymer containing a metal salt-crosslinkable functional group (PA) is generally 5000 to 1000000, preferably 7000 to 100000.

② Polyaddition Polymer Containing a Metal Salt-crosslinkable Functional Group (PB)

As the polyaddition polymer containing a metal salt-crosslinkable functional group (PB) mentioned above, a polyurethane containing a metal salt-crosslinkable functional group (PB1) and a epoxy resin containing a metal salt-crosslinkable functional group (PB2) can be mentioned.

(1) Polyurethane Containing a Metal Salt-crosslinkable Functional Group (PB1)

The polyurethane containing a metal salt-crosslinkable functional group (PB1) can be provided by reacting a hydroxyl compound (b1) containing a metal salt-crosslinkable functional group (e.g. carboxyl), optionally as well as some other active hydrogen-containing compound (b2), with a polyisocyanate compound (b3).

(1-1) Hydroxyl Compound Containing a Metal Salt-crosslinkable Functional Group (b1)

As the hydroxyl compound containing a metal salt-crosslinkable functional group (b1), for example, carboxyl group-containing hydroxyl compounds, glycolic acid, lactic acid, dimethylolpropionic acid, and the alkylene oxide (hereinafter referred to as AO) addition products thereof can be mentioned. Among them, glycolic acid, lacticacid and the AO ddition products thereof are preferred from cost points of view.

As the AO mentioned above, ethylene oxide (hereinafter referred to as EO), propylene oxide (hereinafter referred to as PO), 1,2-, 2,3- or 1,3-butylene oxide, tetrahydrofuran (THF) and epichlorohydrin can be mentioned.

The AO mentioned above may be added singly or of in combination of two or more kinds. In the latter case, the mode of addition maybe block addition (chipped type, balanced type, active secondary type, etc.), random addition, or their mixed system [e.g. chipped after random addition, for example the adduct containing 0 to 50 weight % (preferably 5 to 40 weight %) of ethylene oxide chains randomly distributed in the molecule with 0 to 30 weight % (preferably 5 to 25 weight %) of the EO chains at the terminal ends of the molecule].

Among those species of AO, the exclusive EO, exclusive PO, exclusive THF, combination of PO and EO and combination of PO and/or EO-THF (the combination may be any of random and block types and their mixture) are preferred.

The number of AO molecules added is generally 1 to 400 moles, preferably 1 to 350 moles.

(1-2) Other Active Hydrogen-containing Compound (b2)

The other active hydrogen-containing compound (b2) mentioned above includes the known high molecular weight polyol (b2-1), low molecular weight polyol (b2-2) and polyamine (b2-3) which are conventionally used in the production of polyurethanes.

As the high molecular weight polyol (b2-1) mentioned just above, there can be mentioned polyalkylene ether polyol (b2-11), polyester polyol (b2-12), polymer polyol (b2-13), and polybutadiene polyol (b2-14), inclusive of mixtures of two or more of them.

As the polyalkylene ether polyol (b2-11) mentioned above, there can be mentioned compounds having a structure such that AO has been added to an active hydrogen atom-containing polyfunctional compound and mixtures of two or more of such compounds.

The active hydrogen atom-containing polyfunctional compound mentioned above is not particularly restricted but includes polyhydric alcohols, polyphenols, amines, polycarboxylic acids and phosphoric acid, among others.

The polyhydric alcohols mentioned above are not particularly restricted but include dihydric alcohols such as ethylene glycol, propylene glycol, 1,3-butylene glycol, 1,4-butanediol, 1,6-hexanediol, diethylene glycol, neopentyl glycol, bis(hydroxymethyl)cyclohexane, bis(hydroxyethyl) benzene, etc.; and poly(3 to 8)hydric alcohols such as glycerin, trimethylolpropane, pentaerythritol, diglycerin, α-methylglucoside, sorbitol, xylitol, mannitol, dipentaerythritol, glucose, fructose, sucrose, etc.

The polyphenol mentioned above is not particularly restricted but includes polyhydric phenols such as pyrogallol, catechol, hydroquinone, etc. and bisphenols such as bisphenol A, bisphenol F, bisphenol S, etc.

The amines mentioned above are not particularly restricted but include ammonia, alkylamines of 1 to 20 carbon atoms (e.g. butylamine), monoamines such as aniline; aliphatic polyamines such as ethylenediamine, trimethylenediamine, hexamethylenediamine, diethylenetriamine, etc.; heterocyclic polyamines such as piperazine, N-aminoethylpiperazine and those heterocyclic polyamines described in Japanese Kokoku Publication Sho-55-21044; alicyclic polyamines such as dicyclohexylmethanediamine, isophoronediamine, etc.; aromatic polyamines such as phenylenediamine, tolylenediamine, diethyltolylenediamine, xylylenediamine, diphenylmethanediamine, diphenyletherdiamine, polyphenylmethanepolyamine, etc.; and alkanolamines such as monoethanolamine, diethanolamine, triethanolamine, triisopropanolamine, etc.

The polycarboxylic acids mentioned above are not particularly restricted but include aliphatic polycarboxylic acids such as succinic acid, adipic acid, etc. and aromatic polycarboxylic acids such as phthalic acid, terephthalic acid, trimellitic acid, etc.

Said active hydrogen atom-containing compound can be used in combination of two or more species.

As the above-mentioned AO added to said active hydrogen atom-containing compound, for example, the species of AO mentioned for the hydroxyl compound containing a metal salt-crosslinkable functional group (b1) can be mentioned. Either one or more than one species of AO can be employed and the mode of addition in the latter case includes the modes mentioned above for the hydroxyl compound containing a metal salt-crosslinkable functional group (b1).

The polyester polyol (b2-12) mentioned above includes condensed polyester diols which can be obtained by reacting a low molecular weight diol and/or a polyalkylene ether diol having a molecular weight of not more than 1000 with a dicarboxylic acid, polylactonediols which can be obtained by ring-opening polymerization of lactones, and polycarbonate diols obtainable by reacting a low molecular weight diol with a carbonic diester of a lower alcohol (e.g. methanol).

The above-mentioned low molecular weight diol is not particularly restricted but includes ethylene glycol, diethylene glycol, propylene glycol, dipropylene glycol, 1,4- or 1,3-butanediol, neopentyl glycol, 1,6-hexanediol; cyclic group-containing low molecular weight diols [e.g. bis (hydroxymethyl)cyclohexane, bis(hydroxyethyl)benzene, bisphenol A-EO adduct, etc.]; and mixtures of two or more of said diols.

The above-mentioned polyalkylene ether diol having a molecular weight of not greater than 1,000 is not particularly restricted but includes, among others, polytetramethylene ether glycol, polypropylene glycol, polyethylene glycol and mixtures of two or more of them.

The above-mentioned dicarboxylic acid is not particularly restricted but includes, among others, aliphatic dicarboxylic acids (succinic acid, adipic acid, azelaic acid, sebacic acid, etc.), aromatic dicarboxylic acids (terephthalic acid, isophthalic acid, phthalic acid, etc.), and mixtures of two or more of them.

The above-mentioned lactone is not particularly restricted but includes, among others, ε-caprolactone, γ-butyrolactone, γ-valerolactone and mixtures of two or more of them.

The above-mentioned polyester polyol (b2-12) includes polyethylene adipate diol, polybutylene adipate diol, polyhexamethylene adipate diol, polyneopentyl adipate diol, polyethylenepropylene adipate diol, polyethylenebutylene adipate diol, polybutylenehexamethylene adipate diol, polydiethylene adipate diol, poly (polytetramethylene ether) adipate diol, polyethylene azelate diol, polyethylene sebacate diol, polybutylene azelate diol, polybutylene sebacate diol, polycaprolactone diol or triol, and polyhexamethylene carbonate diol.

The above-mentioned polymer polyol (b2-13) is not particularly restricted but includes, among others, the polyols which can be obtained by polymerizing a radical-polymerizable monomer [e.g. styrene, (meth)acrylonitrile, (meth)acrylic esters, vinyl chloride, and mixtures thereof] in a polyol (said polyalkylene ether polyol (b2-11) and/or polyester polyol (b2-12)) and dispersing the resulting polymer in finely divided state.

The above-mentioned polybutadiene polyol (b2-14) is not particularly restricted but includes those having a 1,2-vinyl structure, those having a 1,2-vinyl structure and a 1,4-trans structure, and those having a 1,4-trans structure. The relative amount of the 1,2-vinyl structure and 1,4-trans structure may be freely varied and may for example be in a molar ratio of 100:0 to 0:100. Moreover, the polybutadiene glycol, for instance, includes both the homopolymer and the copolymer (e.g. styrene-butadiene copolymer, acrylonitrile-butadiene copolymer, etc.), and even the hydrogenation products thereof (hydrogenation rate: 20 to 100%, for instance).

The number average molecular weight of said polybutadiene glycol is generally 500 to 10,000.

The number average molecular weight of said high molecular weight polyol (b2-1) is generally 500 to 20,000, preferably 500 to 10,000, more preferably 1,000 to 3,000.

The above-mentioned low molecular weight polyol (b2-2) includes the polyhydric alcohols and polyphenols mentioned above as the starting material of said polyalkylene ether polyol.

As the above-mentioned polyamine (b2-3), there can be mentioned aliphatic polyamines ($C_2$ to $C_{18}$): e.g. aliphatic polyamines, for example, $C_2$ to $C_6$ alkylenediamines [ethylenediamine, propylenediamine, trimethylenediamine, tetramethylenediamine, hexamethylenediamine, etc.], polyalkylene ($C_2$ to $C_6$)polyamines [diethylenetriamine, iminobispropylamine, bis(hexamethylene)triamine, triethylenetetramine, tetraethylenepentaamine, pentaethylenehexamine, etc.], the alkyl ($C_1$ to $C_4$) or hydroxyalkyl ($C_2$ to $C_4$) substitution products thereof [dialkyl ($C_1$ to $C_3$) aminopropylamine, trimethylhexamethylenediamine, aminoethylethanolamine, methyliminobispropylamine, etc.]; alicycle- or heterocycle-containing aliphatic polyamines, e.g. 3,9-bis(3-aminopropyl)-2,4,8,10-tetraoxaspiro[5,5]undecane, etc.; aromatic ring-containing aliphatic amines ($C_8$ to $C_{15}$) such as xylylenediamine, tetrachloro-p-xylylenediamine, etc.;

alicyclic polyamines ($C_4$ to $C_{15}$): e.g. 1,3-diaminocyclohexane, isophoronediamine, menthanediamine, 4,4'-methylenedicyclohexanediamine (hydrogenated methylenedianiline), etc.;

heterocyclic polyamines ($C_4$ to $C_{15}$): e.g. piperazine, N-aminoethylpiperazine, 1,4-diaminopiperazine, etc.;

aromatic polyamines ($C_6$ to $C_{20}$): e.g. unsubstituted aromatic polyamines, for example, 1,2-, 1,3- and 1,4-phenylenediamines, 2,4'- and 4,4'-diphenylmethanediamine, crude diphenylmethanediamine [polyphenylpolymethylenepolyamine], diaminodiphenylsulfone, benzidine, thiodianiline, bis(3,4- diaminophenyl)sulfone, 2,6-diaminopyridine, m-aminobenzylamine, triphenylmethane-4,4',4"-triamine and naphthylenediamine, among others.

(1-3) Organic Polyisocyanate (b3)

As the organic polyisocyanate (b3), the compounds which are conventionally used in the production of polyurethanes can be used. As such, the polyisocyanate includes aromatic polyisocyanates containing 6 to 20 carbon atoms (exclusive of the carbon in the NCO group; the same applies hereinafter) (b3-1), aliphatic polyisocyanates of 2 to 18 carbon atoms (b3-2), alicyclic polyisocyanates of 4 to 15 carbon atoms (b3-3), aralkyl polyisocyanates of 8 to 15 carbon atoms (b3-4), and modification products of said polyisocyanates (b3-5) (e.g. urethane, carbodiimide, allophanate, urea, biuret, urethodione, urethoimine, isocyanurate, or oxazolidone group-containing modified polyisocyanates), and mixtures of two or more of them.

As the above-mentioned aromatic polyisocyanates (b3-1), there can be mentioned 1,3- and/or 1,4-phenylene diisocyanate, 2,4- and/or 2,6-tolylene diisocyanate (TDI), crude TDI, 2,4'- and/or 4,4'-diphenylmethane diisocyanate (MDI), crude MDI [the reaction product of crude diaminophenylmethane [the condensation product of formaldehyde with an aromatic amine (aniline) or a mixture of aromatic amines; a mixture of diaminodiphenylmethane and a small proportion (e.g. 5 to 20 weight %) of tri- and polyfunctional polyamines] with phosgene: polyallyl polyisocyanate (PAPI)], 1,5-naphthylene diisocyanate, 4,4',4"-triphenylmethane triisocyanate, m- and p-isocyanatophenylsulfonyl isocyanate, etc.

As the above-mentioned aliphatic polyisocyanate (b3-2), there can be mentioned aliphatic polyisocyanates such as ethylene diisocyanate, tetramethylene diisocyanate, hexamethylene diisocyanate (HDI), dodecamethylene diisocyanate, 1,6,11-undecane triisocyanate, 2,2,4-trimethylhexamethylene diisocyanate, lysine diisocyanate, 2,6-diisocyanatomethyl caproate, bis(2-isocyanatoethyl) fumarate, bis(2-isocyanatoethyl) carbonate, 2-isocyanatoethyl-2,6-diisocyanatohexanoate, etc.

As the alicyclic polyisocyanate (b3-3) mentioned above, there can be mentioned polyisocyanates such as isophorone diisocyanate (IPDI), dicyclohexylmethane-4,4'-diisocyanate (hydrogenated MDI), cyclohexylene diisocyanate, methylcyclohexylene diisocyanate (hydrogenated TDI), bis(2-isocyanatoethyl)-4-cyclohexene-1,2-dicarboxylate and 2,5- and/or 2,6-norbornane diisocyanate, etc.

As the aralkyl polyisocyanate (b3-4) mentioned above, there can be mentioned m- and/or p-xylylene diisocyanate (XDI), α, α, α', α'-tetramethylxylylene diisocyanate (TMXDI), etc.

As the modification product (b3-5) of said polyisocyanate, there can be mentioned modified polyisocyanates such as modified MDI (urethane-modified MDI, carbodiimide-modified MDI, trihydrocarbyl phosphate-modified MDI, etc.), urethane-modified TDI, etc. and mixture of two or more such species [e.g. combination use of modified MDI and urethane-modified TDI (a free isocyanate-containing prepolymer)]. As the polyol which can be used for the production of said urethane-modified polyisocyanate [the free isocyanate-containing prepolymer obtainable by reacting an excess of the polyisocyanate (TDI, MDI or the like) with a polyol], there can be mentioned a polyol with an equivalent of 30 to 200, e.g. a glycol such as ethylene glycol, propylene glycol, diethylene glycol, dipropylene glycol, etc.; a triol such as trimethylolpropane, glycerin, etc.; a polyfunctional polyol such as pentaerythritol, sorbitol, etc.; or the corresponding alkylene oxide (ethylene oxide and/or propylene oxide) adduct. Preferred, among them, are polyols each containing 2 to 3 functional groups.

The free isocyanate group content of said modified polyisocyanate or prepolymer is generally 8 to 33%, preferably 10 to 30%, more preferably 12 to 29%.

Among the above-mentioned kinds of polyisocyanates (b3), aromatic diisocyanates (b3-1) are preferred and TDI, MDI, crude MDI and carbodiimide-modified MDI are particularly preferred.

In the polyurethane containing a metal salt-crosslinkable functional group (PB1), the relative amount of said polyisocyanate (b3) and active hydrogen-containing compound (b2) should be such that the active hydrogen equivalent/isocyanate equivalent ratio is generally 0.6 to 1.6, preferably 0.7 to 1.5, more preferably 0.8 to 1.4.

The reaction temperature for the production of said metal salt-crosslinked functional group-containing polyurethane (PB1) may be the same as the temperature used conventionally for polyurethanation reactions and is generally 20 to 100° C. when a solvent is used and generally 20 to 220° C., preferably 150 to 200° C., when the reaction is conducted in the absence of a solvent.

Where necessary, for the purpose of hasting the reaction, a catalyst which is usually employed for polyurethanation, for example, an amine catalyst (e.g. triethylamine, N-ethylmorpholine, triethylenediamine, etc.) or a tin catalyst (e.g. trimethyltin laurate, dibutyltin dilaurate, etc.) can be used.

(2) Epoxy Resin Containing a Metal Salt-crosslinkable Functional Group (PB2)

The epoxy resin containing a metal salt-crosslinkable functional group (PB2) can be obtained by reacting a hydroxyl compound containing a glycidylated metal salt-crosslinkable functional group (e.g. carboxyl group) (b4), optionally together with one or more other epoxy compounds (b5), with an epoxy curing agent (b6).

Referring to the above compound (b4), the above-mentioned compounds can be used as the carboxyl group-containing hydroxyl compound and those compounds can be glycidylated by the known reaction. A typical procedure comprises adding epichlorohydrin to the hydroxyl group in the presence of an acid catalyst and then adding an alkaline compound to the reaction system for desalting to thereby glycidylate.

The other polyepoxy compound (b-5) mentioned above includes but is not limited to: (b5-1): di- or polyphenol glycidyl ether type epoxy resins such as bisphenol A, bisphenol F, phenol or cresol novolac resin, etc. (b5-2): polyol polyglycidyl ether type epoxy resins such as polyalkylene oxide adducts of polyalkylene polyols such as polyethylene polyol, polypropylene polyol, etc. or (b5-1) polyphenols. (b5-3): di- or polyglycidyl ester type epoxy resins which can be derived from polycarboxylic acids such as adipic acid, dimer acid, hexahydrophthalic acid, etc. (b5-4): aliphatic or alicyclic polyepoxide type epoxy resins such as epoxidized polybutadiene, epoxidized vegetable oils, 3,4-epoxy-6-methylcyclohexylmethyl-carboxylate, 3,4-epoxycyclohexylmethylcarboxylate, etc. and combinations of two or more than two kinds of these compounds.

The preferred, among them, are liquid bisphenol A type epoxy resins having an epoxy equivalent of 150 to 340, liquid bisphenol F type epoxy resins having an epoxy equivalent of 155 to 250, diglycidyl ethers of polypropylene glycols having a molecular weight of 250 to 550, diglycidyl ethers of the bisphenol A polypropylene oxide adducts having a molecular weight of 300 to 2000, and mixtures thereof.

Together with said epoxy resin containing a metal salt-crosslinkable functional group (PB2), a monoepoxy reactive diluent may be added to the reaction system. As the monoepoxy reactive diluent mentioned just above, there can be mentioned low-viscosity monoepoxy compounds such as butyl glycidyl ether, 2-ethylhexyl glycidyl ether, phenyl glycidyl ether, cresol glycidyl ether, butyl phenylglycidyl ether, tertiary carboxylic acid glycidyl ethers, styrene oxide, glycidyl methacrylate, etc. Preferred, among them, are 2-ethylhexyl glycidyl ether, phenyl glycidyl ether, cresol glycidyl ether, butylphenyl glycidyl ether and tertiary carboxylic acid glycidyl ethers.

The relative amount of said epoxy resin containing a metal salt-crosslinkable functional group (PB2) and monoepoxy reactive diluent, in combination use, is not particularly restricted but, from workability points of view, is preferably such that the viscosity of the mixture will be 100 to 50000 cps at room temperature.

As the epoxy curing agent (b6) mentioned above, aliphatic polyamines and aliphatic polythiols can be mentioned. The aliphatic polyamines are not particularly restricted but include polyalkylenepolyamines such as ethylenediamine, diethylenetriamine, triethylenetetramine, tetraethylenepentamine, pentaethylenehexamine, propylenediamine, dipropylenetriamine, hexamethylenediamine, dihexamethylenetriamine, etc., and alicyclic polyamines such as xylylenediamine, isophoronediamine, 1,3-bisaminomethylcyclohexane, etc. Among said aliphatic polythiols, ethanedithiol can be mentioned.

Furthermore, amine series curing agents for epoxy resin use, such as the polyamide-polyamine which is obtainable by condensation of a polymeric fatty acid, a higher aliphatic monocarboxylic acid and said polyamine, the polyamine-epoxy adduct obtainable by the addition reaction of a monoepoxy compound, a diepoxy compound and said polyamine, and the modified polyamine obtainable by the addition reaction of acrylonitrile, an α, β-unsaturated carbonyl compound, e.g. an alkyl acrylate, and said polyamine can be used.

Preferred, among them, are polyamines which are soluble or readily dispersible in water, for example triethylenetetramine, hexamethylenediamine, xylylenediamine, polyamide-polyamines having a total amine value of 280 to 450, xylylenediamine- or hexamethylenediamine-butyl glycidyl ether (1.5 to 2 mole) adduct, and xylylenediamine-acrylonitrile (1.8 mole) adduct.

(3) Addition-condensation Polymer Containing a Metal Salt-crosslinkable Functional Group (PC)

As the addition-condensation polymer containing a metal salt-crosslinkable functional group (PC), there can be mentioned, for example, a phenolic resin containing a metal salt-crosslinkable functional group, an urea resin containing a metal salt-crosslinkable functional group and a melamine resin containing a metal salt-crosslinkable functional group.

The phenol resin containing a metal salt-crosslinkable functional group, urea resin containing a metal salt-crosslinkable functional group and metal salt-crosslinkable function group-containing melamine resin are the resol type phenolic resin, or urea- or melamine-formaldehyde primary condensate, which can be obtained by reacting an aromatic compound (c1) containing a metal salt-crosslinkable functional group (e.g. carboxyl group), a phenolic compound, urea or melamine (c2) and an aldehyde compound.

The carboxyl group-containing aromatic compound (c1) mentioned above is not particularly restricted but includes aromatic monocarboxylic acids such as benzoic acid, salicylic acid, etc. and aromaticpolycarboxylic acids such as phthalic acid, isophthalic acid, terephthalic acid, trimellitic acid and pyromellitic acid, among others.

(3-1) Resol Type Phenolic Resin

The resol type phenolic resin is a condensation product in an unhardened (primary condensate) stage which corresponds to the resol stage (Bakelite A) or to the resitol stage (Bakelite B) having proceeded further therefrom. The resin can be produced by the primary condensation reaction of a carboxyl group-containing aromatic compound (c1) and a phenolic compound with an aldehyde compound in the presence of a basic catalyst such as sodium hydroxide, barium hydroxide, or a tertiary amine such as triethylenediamine or trisdimethylaminophenol.

The phenolic compound mentioned above is not particularly restricted but includes phenol; mono- or di-alkylphenols such as cresol, xylenol, butylphenol, octylphenol, nonylphenol, etc.; halogenated phenols such as chlorophenol; and styrenated phenol, among others.

The aldehyde compound is not particularly restricted but includes, for example, formaldehyde, paraformaldehyde and acetaldehyde.

In the above production process, the molar ratio of the carboxyl group-containing aromatic compound (c1) and phenolic compound to the aldehyde compound is generally within the range of 1:1 to 1:3. The molar ratio of the carboxyl group-containing aromatic compound (c1) to the phenolic compound is generally within the range of 1:1 to 9:1.

The resol type phenolic resin is a primary condensation product having a nonvolatile matter content of not less than 75 weight %, with the amount of unreacted phenol having been reduced as far as possible. All that is necessary is that its degree of condensation is within the range of 2 to 10 and that it is a liquid of low to high viscosity at room temperature.

It is also possible to use said resol type phenolic resin after addition of a lower alcohol for improved shelf-life.

Preferred, among various species of the resol type phenolic resin, is a primary condensate having a viscosity of 300 to 20000 cps/25° C. and a nonvolatile matter content of 70 to 100% which can be obtained by condensing said carboxyl group-containing aromatic compound (c1), phenolic compound and formalin in a molar ratio of 1:1:(3.0 to 4.0).

(3-2) Urea- or Melamine-formaldehyde Primary Condensate

The urea- or melamin-formaldehyde primary condensate can be obtained by, for example, reacting (primarily condensing) said carboxyl group-containing aromatic compound (c1), urea or melamine, and an aldehyde compound such as formaldehyde or paraformaldehyde in the presence of a basic catalyst such as sodium hydroxide or barium hydroxide (while the reaction system is maintained at neutral or basic by sequential addition of said catalyst).

In the above process, the molar ratio of said carboxyl group-containing aromatic compound (c1) and urea or melamine to said aldehyde compound is generally in the range of 1:1 to 1:5. Moreover, the molar ratio of said carboxyl group-containing aromatic compound (c1) to urea or melamine is generally 1:1 to 9:1. The urea- or melamin-formaldehyde primary condensate is preferably one having a nonvolatile matter content of not less than 75 weight % with the amount of unreacted urea or melamine having been reduced as far as possible. All that is necessary is that its degree of condensation is 2 to 6 and that it is a liquid of low to high viscosity at room temperature.

As the urea- or melamine-formaldehyde primary condensate, it is also possible to use the corresponding alkyl etherified primary condensate obtainable by adding a lower alcohol for improved shelf-life.

Preferred, among various species of the urea- or melamine-formaldehyde primary condensate, is a primary condensation product having a viscosity of 220 to 35000 cps/25° C. and a nonvolatile matter content of 60 to 90% which is obtainable by reacting said carboxyl group-containing aromatic compound (c1), (urea or melamine) and formaldehyde in a molar ratio of 1:1:(3.0 to 5.0).

In the present invention, the preferred organic polymer among the above-described ① radical-polymerization polymer containing a metal salt-crosslinkable functional group (PA), ② polyaddition polymer containing a metal salt-crosslinkable functional group (PB) and ③ addition-condensation polymer containing a metal salt-crosslinkable functional group (PC) is the ① radical-polymerization polymer containing a metal salt-crosslinkable functional group (PA). The more preferred are (meth)acrylic acid (co)polymers.

Inorganic Substance (II)

In the present invention, the inorganic substance (II) and said metal salt-crosslinked organic polymer expanded matrix (I) constitute the foam of the present invention.

In the foam of the present invention, said inorganic. substance (II) exists in a dispersed state and functions as a flame retardance improving agent.

The inorganic substance (II) mentioned above is at least one member selected from the group consisting of metals, metal compounds and nonmetal inorganic fillers.

The metal mentioned just above is not restricted but includes Group IIIa and Group IVa metals, e.g. aluminum and tin, and transition metals, e.g. iron, nickel, copper and zinc. Those metals may be in the form of metal whiskers.

The metal compound mentioned above may for example be a metal salt, a metal oxide or a metal hydroxide. As a metal salt, for example, the carbonates, sulfates, acetates, borates, phosphates, nitrates and other salts of alkali metals (e.g. sodium, potassium, cesium, etc.), alkaline earth metals (e.g. magnesium, calcium, barium, etc.), Group IIIa and Group IVa metals (e.g. aluminum, germanium, tin) or transition metals (e.g. iron, cobalt, nickel, copper, zinc) can be mentioned.

As the metal oxide mentioned above, the oxides of said alkaline earth metals, Group IIIa and IVa metals, or transition metals can be mentioned.

As the metal hydroxide mentioned, the hydroxides of said alkaline earth metals, Group IIIa and Group IVa metals or transition metals can be mentioned.

The above-mentioned nonmetal inorganic filler is not particularly restricted but includes carbon black, ceramic fiber, glass fiber and bentonite.

From flame retardance points of view, the preferred among the above-mentioned kinds of the inorganic substance (II) are metal hydroxides, with aluminum hydroxide and magnesium hydroxide being particularly preferred.

In the present invention, the foam comprising said metal salt-crosslinked organic polymer expanded matrix (I) and inorganic substance (II) can be manufactured by the following processes, for instance.

1. The process in which said organic polymer containing a metal salt-crosslinkable functional group and said metal or metal compound are subjected to crosslinking and expansion in the presence of an inorganic substance (II) optionally together with a blowing agent. In this process, the crosslinking and expansion proceed concurrently.
2. The process in which said monomer containing a metal-crosslinkable functional group is subjected to concurrent polymerization, crosslinking with a metal or a metal compound and expansion in the presence of an inorganic substance (II) optionally together with a blowing agent. In this process, the crosslinking and expansion proceed concurrently.
3. The process in which said metal salt-crosslinked monomer is subjected to concurrent polymerization and expansion in the presence of an inorganic substance (II) and a blowing agent.

In this specification, the term "metal salt-crosslinked monomer" means a monomer linked to another monomer by metal salt crosslinking.

In the above production processes 1, 2 and 3, the blowing agent need not be used when the metal compound acts as a blowing agent.

The concrete procedures for production in the case of using the radical-polymerization polymer containing a metal salt-crosslinkable functional group (PA) as the organic polymer in said expanded matrix (I) are as follows.

When the above-mentioned process 1 is used, said radical-polymerization polymer containing a metal salt-crosslinkable functional group (PA) and said metal or metal compound are subjected to concurrent crosslinking and expansion in the presence of said inorganic substance (II) optionally together with a blowing agent to provide the foam.

When the above-mentioned process 2 is used, said carboxyl group-containing unsaturated monomer (a1), sulfonic acid group-containing unsaturated monomer (a2) or phosphate group-containing unsaturated monomer (a3), optionally together with said other unsaturated monomer (a4), and said metal or metal compound are subjected to concurrent polymerization, metal salt-crosslinking and expansion in the presence of an inorganic substance (II) optionally together with a blowing agent to provide the foam.

When the above-mentioned process 3 is used, said carboxyl group-containing unsaturated monomer (a1), sulfonic acid group-containing unsaturated monomer (a2) or phosphate group-containing unsaturated monomer (a3) is used to prepare a metal salt-crosslinked monomer in advance and this metal salt-crosslinked monomer, optionally together with (a4), is subjected to concurrent polymerization and expansion in the presence of an inorganic substance (II) and a blowing agent to provide the foam.

The metal salt-crosslinked monomer mentioned above, when (a1) is acrylic acid and said polyvalent metal is magnesium, for instance, is the following compound.

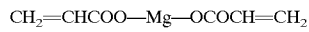

$CH_2=CHCOO-Mg-OCOCH=CH_2$

The concrete procedures for production when said polyurethane containing a metal salt-crosslinkable functional group (PB1) is used as said organic polymer in said expanded matrix (I) are as follows.

When the above-mentioned process 1 is used, the polyurethane containing a metal salt-crosslinkable functional group (PB1) and said metal or metal compound are subjected to concurrent crosslinking and expansion in the presence of an inorganic substance (II) optionally together with a blowing agent to provide the foam.

When the above-mentioned process 2 is used, said metal salt-crosslinkable functional group (carboxyl)-containing hydroxyl compound (b1), optionally together with said other active hydrogen-containing compound (b2), is subjected to concurrent reaction with said polyisocyanate compound (b3), crosslinking with metal or metal compound, and expansion in the presence of an inorganic substance (II) optionally together with a blowing agent to provide the foam.

When the above-mentioned process 3 is used, a metal salt-crosslinked monomer is prepared from said metal salt-crosslinkable functional group (carboxyl)-containing hydroxyl compound (b1) in advance and the above-mentioned metal salt-crosslinked monomer, optionally together with said other active hydrogen-containing compound (b2), is subjected to concurrent reaction with said polyisocyanate compound (b3) and expansion in the presence of an inorganic substance (II) and a blowing agent to provide the foam.

As a concrete example of said metal salt-crosslinked monomer, when said metal salt-polymerizable functional group-containing hydroxyl compound (b1) is glycolic acid and said polyvalent metal is magnesium, for instance, is the following compound.

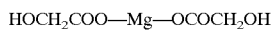
HOCH$_2$COO—Mg—OCOCH$_2$OH

Concrete procedures for production, when said epoxy resin containing a metal salt-crosslinkable functional group (PB2) is used as the organic polymer in said expanded matrix (I) are as follows.

When the above-mentioned process 1 is used, said epoxy resin containing a metal salt-crosslinkable functional group (PB2) and said metal or metal compound are subjected to concurrent crosslinking and expansion in the presence of an inorganic substance (II) optionally together with a blowing agent to provide the foam.

When the above-mentioned process 2 is used, the glycidyl compound (b4) prepared from said metal salt-crosslinkable functional group (carboxyl)-containing hydroxyl compound, optionally together with said other epoxy compound (b5), is subjected to concurrent reaction with said epoxy curing agent (b6), crosslinking with a metal or metal salt and expansion in the presence of an inorganic substance (II) optionally together with a blowing agent.

When the above-mentioned process 3 is used, a metal salt-crosslinked monomer is prepared from the glycidyl compound (b4) prepared from said metal salt-crosslinkable functional group (carboxyl)-containing hydroxyl compound in advance and this metal salt-crosslinked monomer, optionally together with said other epoxy compound (b5), is subjected to concurrent reaction with said epoxy curing agent (b6) and expansion in the presence of an inorganic substance (II) and a blowing agent to provide the foam.

As a concrete example of said metal salt-crosslinked monomer, when said glycidyl compound (b4) prepared from said hydroxyl compound containing a metal salt-crosslinkable functional group is the glycidylation product of glycolic acid and said polyvalent metal is magnesium, for instance, is the following compound.

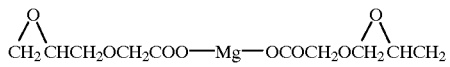
CH$_2$CHCH$_2$OCH$_2$COO—Mg—OCOCH$_2$OCH$_2$CHCH$_2$

Concrete procedures for production, when said addition-condensation polymer containing a metal salt-crosslinkable functional group (PC) is used as the organic polymer in said expanded matrix (I), are as follows.

When the above-mentioned process 1 is used, said addition-condensation polymer containing a metal salt-crosslinkable functional group (PC) and said metal or metal compound are subjected to concurrent crosslinking and expansion in the presence of an inorganic substance (II) optionally together with a blowing agent to provide the foam.

When the above-mentioned process 2 is used, said metal salt-crosslinkable functional group (carboxyl)-containing aromatic compound (c1), phenolic compound, urea or melamine (c2), and said aldehyde compound are subjected to concurrent reaction, crosslinking with a metal or a metal compound and expansion in the presence of an inorganic substance (II) optionally together with a blowing agent to provide the foam.

When the above-mentioned process 3 is used, a metal salt-crosslinked monomer is prepared from said metal salt-crosslinkable functional group (carboxyl)-containing aromatic compound (c1) in advance and this metal salt-crosslinked monomer, said phenolic compound, urea ormelamine (c2), and said aldehyde compound are subjected to concurrent reaction and expansion in the presence of an inorganic substance (II) and a blowing agent to provide the foam.

A concrete example of said metal salt-crosslinked monomer, when said aromatic compound containing a metal-crosslinkable functional group (c1) is benzoic acid and said polyvalent metal is magnesium, for instance, is the following compound.

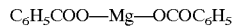
C$_6$H$_5$COO—Mg—OCOC$_6$H$_5$

Suitable other optional components may be incorporated in the foam of the present invention. For example, polyethylene glycol (mol. wt. 100 to 100,000), dyes and pigments, cellulose, starch, flame retardants such as trischloroethyl phosphate, trischloropropyl phosphate, etc., silicon- or fluorine-containing foam stabilizers, water, etc. can be mentioned.

The amount of such optional components is not particularly restricted but, in consideration of foam quality, it should generally be not greater than 50 weight %, preferably not greater than 20 weight %, based on the product foam.

The expansion ratio of the foam of the present invention can be freely selected according to the intended use but, from the standpoint of foam quality, is generally 5 to 100 times, preferably 5 to 50 times, more preferably 5 to 40 times.

The density of the foam of the present invention can also be freely selected according to the intended use but from the standpoint of foam quality, is generally 0.02 to 0.30 g/m$^3$, preferably 0.03 to 0.25 g/cm$^3$, more preferably 0.03 to 0.20 g/cm$^3$.

As produced by the above-described technology, the foam of the present invention can be provided in the quality grades corresponding to Flame Retardance Grade 1 or 2 under JIS A-1321.

The foam of the present invention can be provided in the form of a shaped article which may be a board, a sheet, a film, a bar, a cylinder or the like. It is also possible to apply any of the known expansion-foaming techniques such as RIM and the known processing techniques such as transfer molding. Moreover, the foam of the present invention can be subjected to surface treatment such as coating, and other after-treatments such as saturation with a fragrance.

As the uses for the foam of the present invention, structural materials (e.g. steel reinforcement cores), protective materials (e.g. packing and other cushioning materials), heat insulating materials (heat-insulating boards etc.) and sound insulating materials (e.g. acoustic boards), among others, can be mentioned.

BEST MODE FOR CARRYING OUT THE INVENTION

In the following, the present invention is illustrated by examples in further detail and should by no means be construed as defining the scope of the invention. In the following description, all "parts" and "%" are by weight.

The compositions and symbols of the starting materials used in the examples and comparative examples are as follows.

AAc: acrylic acid

AAc-Z: zinc diacrylate

St: styrene

PAAc: a polyacrylic acid with a number average molecular weight of about 10000

DHA: dipentaerythritol hexaacrylate

Chlorofluorocarbon: Daiflon 141b, manufactured by Daicel Chemical Co., Ltd.

Polymeric MDI: Coronate MR-200, manufactured by Nippon Polyurethane Industry, Co., Ltd.

PBAAc: a butyl acrylate-acrylic acid copolymer (acrylic acid content: 20 wt. %) having an average molecular weight of about 10000

Reactive emulsifier: Eleminol RS-30, manufactured by Sanyo Kasei Co., Ltd.

Urethanation catalyst: Polycat 41, manufactured by Sun-Apro Co., Ltd.

Foam stabilizer: SZ-1627, manufactured by Nippon Unicar Co., Ltd.

Production Example 1

In water, 152 g of glycolic acid and 315.3 g of barium hydroxide ($8H_2O$) were reacted at 25° C. for 1 hour. This reaction product was dehydrated, crushed and further dried at 120° C. for 2 hours. Then, using 2 g of triethylamine as catalyst, 176 g of ethylene oxide was added, whereby a polyether diol having a hydroxyl value of 240 (Compound A) was obtained.

Production Example 2

To 463.3 g of the above compound A was added 1 g of boron trifluoride-diethyl ether complex salt as catalyst, and 277.5 g (3 moles) of epichlorohydrin was added dropwise at 60° C. The addition reaction was carried out at the same temperature for about 2 hours. Then, 160 g of 50% sodium hydroxide in water was added and the desalting reaction was carried out at 25° C. for 4 hours. Then, water was removed to provide a diglycidyl compound having an epoxy equivalent of 334 (Compound B).

Production Example 3

In water, 138 g of salicylic acid and 94 g of phenol were stirred at 20 to 30° C. Using 4 g of sodium hydroxide as catalyst, 284 g of formalin was added dropwise under cooling. The reaction was carried out at 90° C. for 2.5 hours. To maintain the pH of the reaction system at 8.5 to 9.5, sodium hydroxide was gradually added during the reaction. The reaction mixture was then adjusted to pH 7 to 8 with p-toluenesulfonic acid and then cooled and the unreacted starting materials and part of the water of condensation were removed from the system under reduced pressure to provide a liquid resol type phenolic resin having a nonvolatile matter content of 76% and a viscosity of 21000 cps (Compound C).

Production Example 4

In water, 138 g of salicylic acid and 60 g of urea were stirred at 20 to 30° C., and in the presence of 4 g of sodium hydroxide catalyst, 284 g of formalin was added dropwise under cooling. The reaction was then carried out at 90° C. for 2.5 hours. To maintain the pH of the reaction system at 8.5 to 9.5, sodium hydroxide was gradually added during the reaction. The reaction mixture was then adjusted to pH 7 to 8 with p-toluenesulfonic acid and then cooled and the unreacted starting materials and part of the water of condensation were removed from the system under reduced pressure to provide a liquid urea-formaldehyde primary condensate having a nonvolatile matter content of 75% and a viscosity of 25000 cps (Compound D).

Production Example 5

In water, 138 g of salicylic acid and 126 g of melamine were stirred at 20 to 30° C., and in the presence of sodium hydroxide catalyst, 284 g of formalin was added dropwise under cooling. The reaction was then carried out at 90° C. for 2.5 hours. To maintain the pH of the reaction system at 8.5 to 9.5, sodium hydroxide was gradually added during the reaction. The reaction mixture was then adjusted to pH 7 to 8 with p-toluenesulfonic acid and then cooled and the unreacted starting materials and part of the water of condensation were removed from the system under reduced pressure to provide a liquid melamine-formaldehyde primary condensate having a nonvolatile matter content of 75% and a viscosity of 19000 cps (Compound E).

EXAMPLES 1 AND 2

Referring to Table 1, Mixture A, Mixture B, ascorbic acid and hydrogen peroxide (35%) were mixed in the indicated ratio and the mixture was placed in a mould. Almost instantly, the mixture underwent polymerization and expansion to give a foam in several minutes. The quality of this foam are shown in Table 1.

EXAMPLE 3

Referring to Table 1, Mixture A, Mixture B and the urethanation catalyst were mixed in the indicated ratio and the mixture was placed in a mould. The mixture underwent polymerization and expansion after 5 seconds and gave a foam in several minutes. The quality of this foam are shown in Table 1.

EXAMPLE 4

Referring to Table 1, Mixture A and Mixture B were mixed in the indicated ratio and the mixture was placed in a mould. The filled mould was allowed to set in an oven at 100° C. for 20 minutes to let expansion and crosslinking take place to provide a form. The quality of this foam are shown in Table 1.

EXAMPLES 5 TO 7

Referring to Tables 1 and 2, Mixture A and Mixture B were mixed in the indicated ratio and the mixture was placed in a mould. This mould was allowed to set in an oven at 120° C. for 2 hours to let expansion and crosslinking take place to provide a foam. The quality of this foam are shown in Tables 1 and 2.

Comparative Example 1

Referring to Table 2, Mixture A and Mixture B were adjusted to a temperature of 80° C. and mixed in the indicated ratio and the mixture was placed in a mould. This mould was allowed to set in an oven at 100° C. for 20 minutes to let expansion and crosslinking take place to provide a foam. The quality of this foam are shown in Table 2.

Comparative Example 2

Using a Bambery mixer, 2 weight parts of PBAAc pellets and 3 weight parts of calcium carbonate powder were kneaded to prepare a pelletized calcium carbonate master batch (Mixture B). These Mixture B and Mixture A (a mixture of 100 weight parts of PBAAc and 0.5 weight part of foam stabilizer), in the ratio indicated in Table 2, were fed to a melt-kneading extruder and molded at an extrusion rate of 10 kg/hour, a resin pressure of 190 kg/cm² and a resin temperature of 180° C. to provide a foam. The quality of this foam are shown in Table 2.

TABLE 1

|  | Example | | | | | |
| --- | --- | --- | --- | --- | --- | --- |
|  | 1 | 2 | 3 | 4 | 5 | 6 |
| Mixture A | | | | | | |
| AAc | 100 | 0 | 0 | 0 | 0 | 0 |
| St | 0 | 50 | 0 | 0 | 0 | 0 |
| DHA | 10 | 0 | 0 | 0 | 0 | 0 |
| Compound A | 0 | 0 | 100 | 0 | 0 | 0 |
| Compound B | 0 | 0 | 0 | 100 | 0 | 0 |
| Compound C | 0 | 0 | 0 | 0 | 100 | 0 |
| Compound D | 0 | 0 | 0 | 0 | 0 | 100 |
| Chorofluoro-carbon | 0 | 20 | 20 | 20 | 0 | 0 |
| Reactive emulsifier | 0 | 1 | 0 | 0 | 0 | 0 |
| Foam satabilizer | 0.5 | 0.5 | 0.5 | 0.5 | 0.5 | 0.5 |
| Mixture B | | | | | | |
| CaCO₃ | 70 | 10 | 10 | 10 | 0 | 0 |
| BaCO₃ | 0 | 0 | 0 | 0 | 45 | 34 |
| AAc-Z | 0 | 50 | 0 | 0 | 0 | 0 |
| Water | 30 | 50 | 0 | 0 | 45 | 34 |
| Polymeric MDI | 0 | 0 | 50 | 0 | 0 | 0 |
| Diethylene-triamine | 0 | 0 | 0 | 31 | 0 | 0 |
| Ascorbic acid | 0.1 | 0.4 | 0 | 0 | 0 | 0 |
| Hydrogen peroxide | 0.02 | 0.2 | 0 | 0 | 0 | 0 |
| Urethanation catalyst | 0 | 0 | 2.0 | 0 | 0 | 0 |
| Result | | | | | | |
| Density | 30 | 30 | 50 | 70 | 50 | 50 |
| Expansion ratio | 35 | 35 | 20 | 15 | 20 | 20 |
| Compressive strength | 3.0 | 3.5 | 1.5 | 2.0 | 1.5 | 1.5 |
| Flame retardance | | | | | | |
| Burning rate | 0.5 | 0.5 | 1.0 | 1.2 | 0.7 | 0.8 |
| Temperature-time area | 0 | 0 | 43 | 61 | 28 | 20 |
| Emitting smoke factor | 20 | 25 | 35 | 42 | 34 | 26 |
| Afterflame time | 0 | 0 | 15 | 20 | 8 | 6 |
| Electrification | Excellent | Excellent | Excellent | Excellent | Excellent | Excellent |
| Heat insulating coefficient | 0.04 | 0.04 | 0.04 | 0.04 | 0.04 | 0.04 |
| Sound insulating property | 25 | 20 | 25 | 20 | 20 | 20 |
| M | 11 | 15 | 19 | 15 | 19 | 15 |
| S | 18 | 9 | 6 | 9 | 6 | 5 |

TABLE 2

|  | Ex. 7 | Compar. Ex. 1 | Compar. Ex. 2 |
| --- | --- | --- | --- |
| Mixture A | | | |
| Compound E | 100 | 0 | 0 |
| PAAc | 0 | 100 | 0 |
| Water | 0 | 100 | 0 |
| PBAAc | 0 | 0 | 100 |
| Foam satabilizer | 0.5 | 0.5 | 0.5 |
| Mixture B | | | |
| CaCO₃ | 0 | 5 | 3 |
| BaCO₃ | 52 | 0 | 0 |
| Water | 52 | 5 | 0 |
| PBAAc | 0 | 0 | 2 |
| Result | | | |
| Density | 70 | 500 | 300 |
| Expansion ratio | 15 | 2.2 | 3.3 |
| Compressive strength | 3.5 | 4.5 | 5.5 |
| Flame retardance | 1.0 | 5.2 | 5.8 |
| Burning rate | | | |
| Temperature-time area | 80 | 210 | 360 |
| Emitting smoke factor | 57 | 150 | 250 |
| Afterflame time | 22 | 45 | 60 |
| Electrification | Excellent | Good | Good |
| Heat insulating coefficient | 0.04 | 0.10 | 0.12 |
| Sound insulating property | 25 | 5 | 7 |
| M | 21 | 1.2 | 0.7 |
| S | 7 | 3.1 | 1.8 |

Density: (kg/m³): according to JIS K 6310

Compressive strength: (kg/cm²): according to JIS A 9514

Flame Retardance

Burning rate: (cm/min): according to JIS A 9514

Temperature-time area: (°C·min.): according to JIS A 1321

Emitting smoke factor: (CA): according to JIS A 1321

Afterflame time: (sec.): according to JIS A 1321

Electrification: the electrification at 25° C. and 50% R.H. was tested and evaluated on a rating scale of Excellent, Good, Fair and Poor [any level below the prior art foam was rated Poor]

Thermal conductivity: (Kcal/m·h·°C): according to JIS A 9514

Sound insulating property: (dB): according to JIS A 1416

The weight % (M) of the metal forming the metal salt-crosslinks and the weight % (S) of inorganic matter: Powders of the foam as such are analyzed by X-ray diffraction analysis to find the weight % (S) of the inorganic matter. Then, powders prepared by incinerating the foam were analyzed to determine the weight of the metal oxide. From this weight, the weight of the metal oxide derived from the inorganic matter is subtracted and the weight % (M) of the metal foaming the metal salt crosslinks is calculated from the balance of metal content.

The following X-ray generator and detector (goniometer) were used.

X-ray Generator

RU-200R (rotary paired cathode type) manufactured by Rigaku Denki, K. K.

X-ray source: CuKα line, with curved crystal monochromator

Power output: 40 kV, 150 mA
Goniometer
Model 2155D, manufactured by Rigaku Denki, K. K.
Slit system: 1°–0.15 mm–1°–0.45 mm
Detector: scintillation counter

INDUSTRIAL APPLICABILITY

The foam of the present invention is outstanding in electrification and heat insulating and sound insulating properties and has high compressive strength even when it is low in density. Moreover, since it contains no material with a high ecological load, the generation of noxious gases and soot due to incomplete combustion is not remarkable, nor is an excessive generation of heat of combustion involved. Therefore, the foam of the present invention is useful for such applications as a heat insulating material, a structural material, a protective material, a sound insulating material and so forth. The used foam can be burnt in admixture with other general refuses in ordinary incinerators and imposes little burden on the environment, thus finding application with great advantage in power generation using the refuse, for instance.

What is claimed is:

1. A foam comprising an organic polymer expanded matrix (I) and at least one kind of inorganic substance (II) selected from the group consisting of metals, metal compounds and non-metal inorganic fillers, wherein said organic polymer is at least one polymer selected from the group consisting of epoxy resins containing metal salt-crosslinkable functional groups, and addition-condensation polymers containing metal salt-crosslinkable functional groups, and said expanded matrix (I) contains metal salt-crosslinks, and the relation between the weight percentage (M) of the metal forming said metal salt-crosslinks in the expanded matrix (I) based on the total weight of the expanded matrix (I) and the inorganic substance (II) and the weight percentage (S) of the inorganic substance (II) based on the total weight of the expanded matrix (I) and the inorganic substance (II) satisfies the following expression:

$$M \geq 10 - S/4 \qquad (1)$$

wherein $M \leq 50$, $S \geq 5$.

2. The foam according to claim 1 wherein the expanded matrix (I) is a matrix expanded using at least one member selected from the group consisting of metal carbonates and metal hydrogencarbonates.

3. The foam according to claim 1 wherein the metal forming said metal salt-crosslinks in the expanded matrix (I) is at least one polyvalent metal selected from the group consisting of calcium, magnesium, zinc, barium, aluminum and iron.

4. The foam according to claim 1 which has an expansion ratio of 5 to 50.

5. The foam according to claim 1 wherein the organic polymer is at least one polymer selected from the group consisting of epoxy resins containing metal salt-crosslinkable functional groups, phenolic resins containing metal-salt-crosslinkable functional groups, urea resins containing metal salt-crosslinkable functional groups and melamine resins containing metal salt-crosslinkable functional groups.

6. The foam according to claim 1 wherein the metal salt-crosslinkable functional group is at least one group selected from the group consisting of carboxyl group, sulfonic acid group and phosphate group.

7. The foam according to claim 1 wherein the metal salt-crosslinkable functional group content of the organic polymer is 30 to 625 milliequivalents/g.

8. A foam comprising an organic polymer expanded matrix (I) and at least one kind of inorganic substance (II) selected from the group consisting of metals, metal compounds and non-metal inorganic fillers, wherein said organic polymer is at least one polymer selected from the group consisting of radical-polymerization polymers containing metal salt-crosslinkable functional groups, epoxy resins containing metal salt-crosslinkable functional groups, and addition-condensation polymers containing metal salt-crosslinkable functional groups, and said expanded matrix (I) contains metal salt-crosslinks, and said inorganic substance (II) is at least one member selected from the group consisting of metal oxides and metal hydroxides, and the relation between the weight percentage (M) of the metal forming said metal salt-crosslinks in the expanded matrix (I) based on the total weight of the expanded matrix (I) and the inorganic substance (II) and the weight percentage (S) of the inorganic substance (II) based on the total weight of the expanded matrix (I) and the inorganic substance (II) satisfies the following expression:

$$M \geq 10 - S/4 \qquad (1)$$

wherein $M \leq 50$, $S \geq 5$.

9. The foam according to claim 8 wherein the metal hydroxide is at least one member selected from the group consisting of aluminum hydroxide and magnesium hydroxide.

10. The foam according to claim 1 which has a flame retardance corresponding to Grade 1 or Grade 2 under JIS A-1321.

11. A heat insulating material, a structural material, a protective material or a sound insulating material which comprises the foam according to claim 1.

12. A process for producing a metal salt-crosslinked foam according to claim 1 which comprises subjecting an organic polymer containing a metal salt-crosslinkable functional group to crosslinking with a metal or metal compound and expansion in the presence of an inorganic substance (II).

13. The process according to claim 12 wherein a blowing agent is additionally present.

14. A process for producing a metal salt-crosslinked foam according to claim 1 which comprises subjecting a metal salt-linkable functional group-containing monomer to concurrent polymerization, crosslinking with a metal or metal compound and expansion in the presence of an inorganic substance (II), wherein said metal salt-crosslinked foam comprises an organic polymer expanded matrix (I) and an inorganic substance (II).

15. The process according to claim 14 wherein a blowing agent is additionally present.

16. A process for producing a metal salt-crosslinked foam which comprises subjecting an already metal salt-crosslinked monomer to concurrent polymerization and expansion in the presence of an inorganic substance (II) and a blowing agent, wherein said metal salt-crosslinked foam comprises an organic polymer expanded matrix (I) and an inorganic substance (II), and said organic polymer is at least one polymer selected from the group consisting of radical-polymerization polymers containing metal salt-crosslinkable functional groups, epoxy resins containing metal salt-crosslinkable functional groups, and addition-condensation polymers containing metal salt-crosslinkable functional groups.

* * * * *

UNITED STATES PATENT AND TRADEMARK OFFICE
CERTIFICATE OF CORRECTION

PATENT NO.     : 6,555,591 B1
DATED          : April 29, 2003
INVENTOR(S)    : Tsuyoshi Tomosada et al.

It is certified that error appears in the above-identified patent and that said Letters Patent is hereby corrected as shown below:

<u>Column 22,</u>
Line 53, replace the word "salt-linkable" with the word -- "salt-crosslinkable." --

Signed and Sealed this

Nineteenth Day of August, 2003

JAMES E. ROGAN
*Director of the United States Patent and Trademark Office*